(12) United States Patent
Chen et al.

(10) Patent No.: US 9,432,175 B2
(45) Date of Patent: Aug. 30, 2016

(54) CONTROL CHANNEL MANAGEMENT FOR RELAY BACKHAUL

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 14/073,297

(22) Filed: Nov. 6, 2013

(65) Prior Publication Data
US 2014/0133367 A1    May 15, 2014

Related U.S. Application Data

(60) Provisional application No. 61/724,778, filed on Nov. 9, 2012.

(51) Int. Cl.
| | |
|---|---|
| *H04B 7/14* | (2006.01) |
| *H04L 5/16* | (2006.01) |
| *H04W 72/04* | (2009.01) |
| H04W 84/04 | (2009.01) |
| H04B 7/155 | (2006.01) |
| H04W 56/00 | (2009.01) |

(52) U.S. Cl.
CPC .............. *H04L 5/16* (2013.01); *H04W 72/042* (2013.01); *H04B 7/155* (2013.01); *H04W 56/0045* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 2011/0051654 A1 | 3/2011 | Blankenship et al. | |
| 2011/0103295 A1 | 5/2011 | Khandekar et al. | |
| 2011/0268064 A1 | 11/2011 | Chen et al. | |
| 2011/0274031 A1 | 11/2011 | Gaal et al. | |
| 2012/0044841 A1 | 2/2012 | Chen et al. | |
| 2012/0076040 A1* | 3/2012 | Hoshino et al. | 370/252 |
| 2012/0106501 A1* | 5/2012 | Kishiyama et al. | 370/330 |
| 2012/0218964 A1 | 8/2012 | Park et al. | |
| 2013/0034043 A1 | 2/2013 | Yu et al. | |
| 2013/0044654 A1* | 2/2013 | Chen et al. | 370/280 |
| 2013/0044727 A1* | 2/2013 | Nory et al. | 370/330 |
| 2013/0070722 A1* | 3/2013 | Li et al. | 370/329 |
| 2013/0083704 A1* | 4/2013 | Gaal et al. | 370/277 |
| 2013/0301434 A1* | 11/2013 | Krishnamurthy et al. | 370/252 |

FOREIGN PATENT DOCUMENTS

WO    WO-2011103153 A2    8/2011

OTHER PUBLICATIONS

International Search Report and Written Opinion—PCT/US2013/068935—ISA/EPO—Mar. 24, 2014.

(Continued)

*Primary Examiner* — Mark Rinehart
*Assistant Examiner* — Angel Brockman
(74) *Attorney, Agent, or Firm* — Patterson & Sheridan, L.L.P.

(57) ABSTRACT

Aspects of the present disclosure provide techniques for managing control channels for relays that utilize half-duplex operation. According to certain aspects, a certain type of PDCCH may be selected based on one or more criteria.

30 Claims, 10 Drawing Sheets

(56) References Cited

OTHER PUBLICATIONS

LG-NORTEL: "Control Channel Design for Relay Backhaul Link in FDM+TDM Scheme", 3GPP Draft; R1-094453 Control Channel Design for Relay Backhaul Link in FDM+TDM Scheme V0.I, 3rd Generation Partnership Project (3GPP), Mobile Competence Centre ; 650, Route Des Lucioles ; F-06921 Sophia-Antipolis Cedex ; France, No. Jeju; Nov. 9, 2009, XP050388879, [retrieved on Nov. 23, 2009].

NEC Group: "Further details of the Relay type 1 control design", 3GPP Draft; R1-093224 Further Details of the Relay Type 1 Control Design, 3rd Generation Partnership Project (3GPP), Mobile Competence Centre; 650, Routes Des Lucioles; F-06921 Sophia-Antipolis CEDEX; France, val. RAN WG1, No. Shenzhen, P.R. China; Aug. 24, 2009-Aug.28, 2009, Aug. 19, 2009, pp. 1-5, XP050597646, [retrieved on Aug. 19, 2009] p. 1. line 10-p. 5, line 8; figure 1.

Renesas Mobile Europe Ltd: "E-PDCCH design aspects", 3GPP Draft; R1-113174, 3rd Generation Partnership Project (3GPP), Mobile Competence Centre ; 650, Route Des Lucioles ; F-06921 Sophia-Antipolis CEDEX ; France, vol. RAN WG1, No. Zhuhai; Oct. 4, 2011, pp. 1-6, XP050538301 [retrieved on Oct. 4, 2011] p. 1, line 8-p. 4, line 25.

\* cited by examiner

CONTROL CHANNEL MANAGEMENT FOR RELAY BACKHAUL

CROSS-REFERENCE TO RELATED APPLICATIONS

The present Application for Patent claims priority to U.S. Provisional Application No. 61/724,778, filed Nov. 9, 2012, which is assigned to the assignee of the present application and hereby expressly incorporated by reference herein in its entirety.

FIELD

Aspects of the present disclosure relate generally to wireless communication systems, and more particularly, to techniques for communicating a physical downlink control channel (PDCCH) to a relay node.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications by a base station. The method generally includes selecting, based on one or more criteria, a first type of physical downlink control channel (PDCCH) or a second type of PDCCH for transmission to a half duplex relay node used to relay transmissions between the base station and a user equipment (UE) served by the base station and transmitting a PDCCH of the selected type to the half duplex relay node in a subframe.

Certain aspects of the present disclosure provide a method for wireless communications by a relay node. The method generally includes determining whether to monitor for a first type of physical downlink control channel (PDCCH) or a second type of PDCCH transmitted from a base station that uses the relay node to relay transmissions between the base station and a user equipment (UE) served by the base station and monitoring for a PDCCH of the determined type in a subframe.

Certain aspects of the present disclosure provide an apparatus for wireless communications by a base station. The apparatus generally includes means for selecting, based on one or more criteria, a first type of physical downlink control channel (PDCCH) or a second type of PDCCH for transmission to a half duplex relay node used to relay transmissions between the base station and a user equipment (UE) served by the base station and means for transmitting a PDCCH of the selected type to the half duplex relay node in a subframe.

Certain aspects of the present disclosure provide an apparatus for wireless communications by a relay node. The apparatus generally includes means for determining whether to monitor for a first type of physical downlink control channel (PDCCH) or a second type of PDCCH transmitted from a base station that uses the relay node to relay transmissions between the base station and a user equipment (UE) served by the base station and means for monitoring for a PDCCH of the determined type in a subframe.

Certain aspects of the present disclosure provide an apparatus for wireless communications by a base station. The apparatus generally includes at least one processor configured to select, based on one or more criteria, a first type of physical downlink control channel (PDCCH) or a second type of PDCCH for transmission to a half duplex relay node used to relay transmissions between the base station and a user equipment (UE) served by the base station and transmit a PDCCH of the selected type to the half duplex relay node in a subframe; and a memory coupled with the at least one processor.

Certain aspects of the present disclosure provide an apparatus for wireless communications by a relay node. The apparatus generally includes at least one processor configured to determine whether to monitor for a first type of physical downlink control channel (PDCCH) or a second type of PDCCH transmitted from a base station that uses the relay node to relay transmissions between the base station and a user equipment (UE) served by the base station and monitor for a PDCCH of the determined type in a subframe; and a memory coupled with the at least one processor.

Certain aspects of the present disclosure provide a computer program product for wireless communications by a base station comprising a computer readable medium having instructions stored thereon. The instructions are generally executable by one or more processors for selecting, based on one or more criteria, a first type of physical downlink control channel (PDCCH) or a second type of PDCCH for transmission to a half duplex relay node used to relay transmissions between the base station and a user equipment (UE) served by the base station and transmitting a PDCCH of the selected type to the half duplex relay node in a subframe.

Certain aspects of the present disclosure provide a computer program product for wireless communications by a relay node comprising a computer readable medium having instructions stored thereon. The instructions are generally executable by one or more processors for determining whether to monitor for a first type of physical downlink control channel (PDCCH) or a second type of PDCCH transmitted from a base station that uses the relay node to relay transmissions between the base station and a user equipment (UE) served by the base station and monitoring for a PDCCH of the determined type in a subframe.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
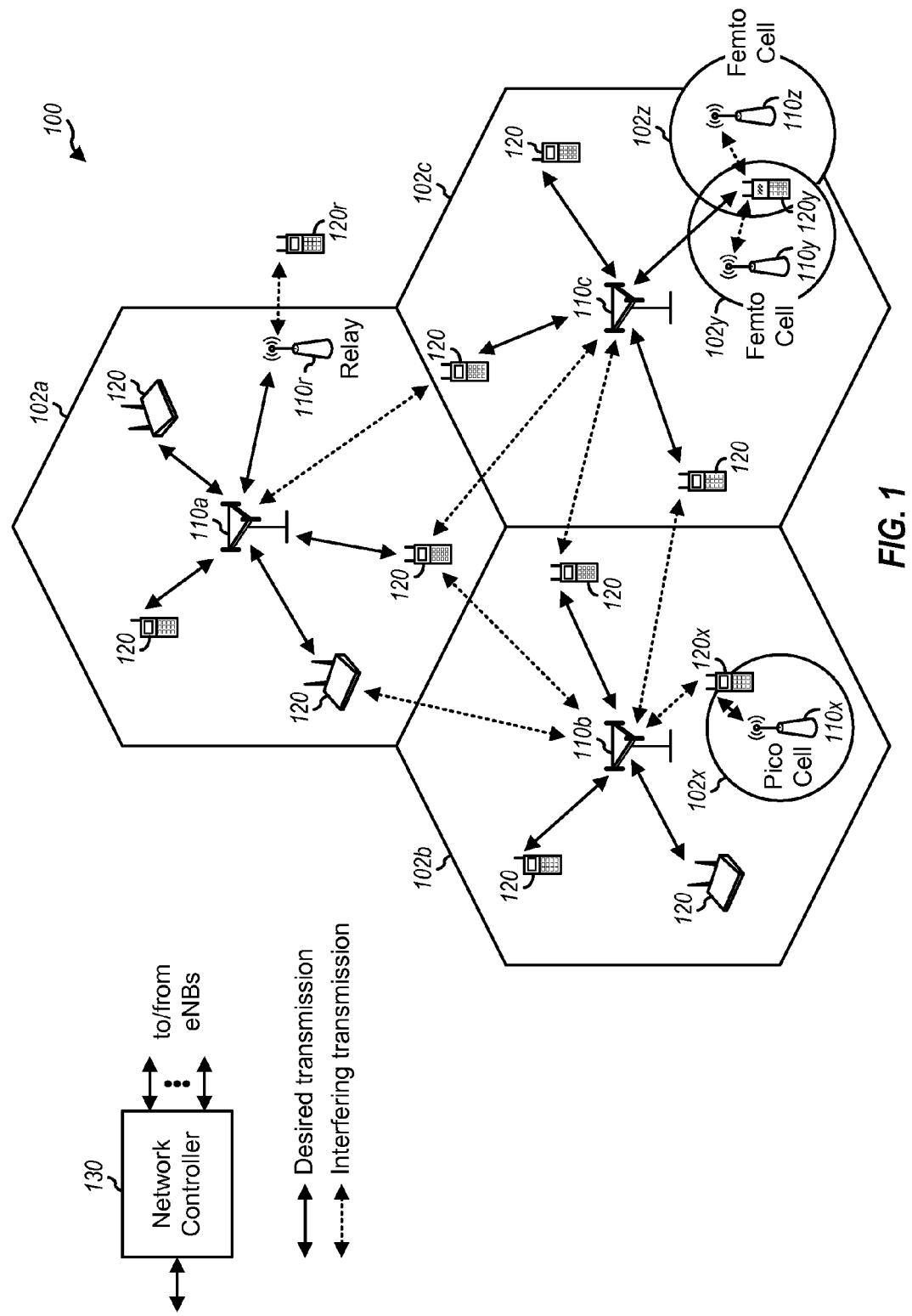
FIG. 1 is a block diagram conceptually illustrating an example of a telecommunications system, in accordance with aspects of the present disclosure.

FIG. 1 shows a wireless communication network 100, which may be an LTE network. The wireless network 100 may include a number of evolved Node Bs (eNodeBs) 110 and other network entities. An eNodeB may be a station that communicates with the UEs 120 and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB 110 and/or an eNodeB subsystem serving this coverage area, depending on the context in which the term is used.

An eNodeB may provide communication coverage for a macro cell 102a, 102b, 102c, a pico cell 102x, a femto cell 102y, 102z, and/or other types of cells. A macro cell 102a may cover a relatively large geographic area (e.g., several kilometers in radius) and may allow unrestricted access by UEs 120 with service subscriptions. A pico cell 102x may cover a relatively small geographic area and may allow unrestricted access by UEs 120 with service subscription. A femto cell 102y, 102z may cover a relatively small geographic area (e.g., a home) and may allow restricted access by UEs 120 having association with the femto cell 102y, 102z (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b, and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs 110 and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 2:
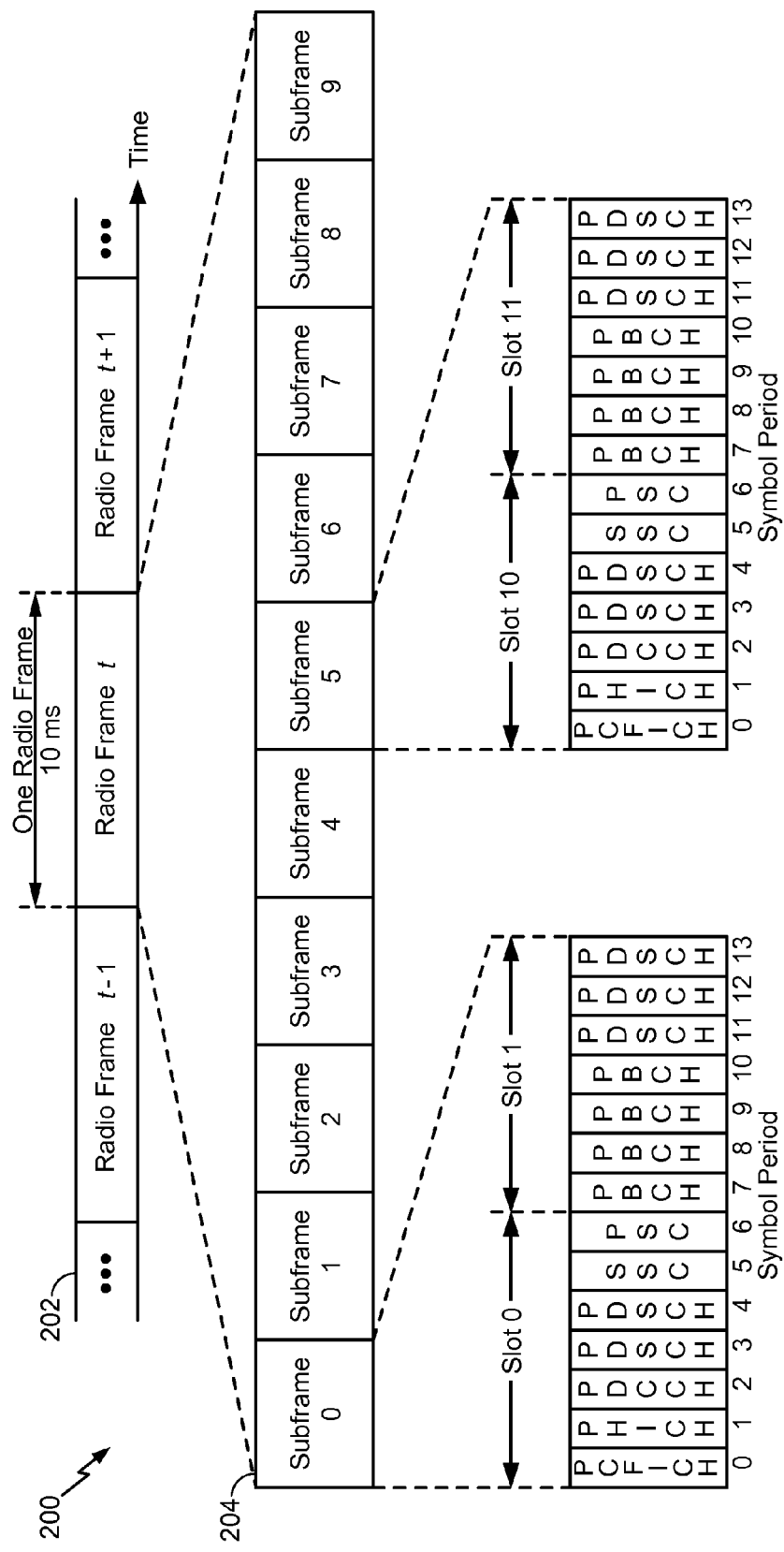
FIG. 2 is a block diagram conceptually illustrating an example of a downlink frame structure in a telecommunications system, in accordance with aspects of the present disclosure.

FIG. 2 shows a downlink frame structure 200 used in LTE. The transmission timeline for the downlink may be partitioned into units of radio frames 202. Each radio frame may have a predetermined duration (e.g., 10 milliseconds (ms)) and may be partitioned into 10 subframes 204 with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
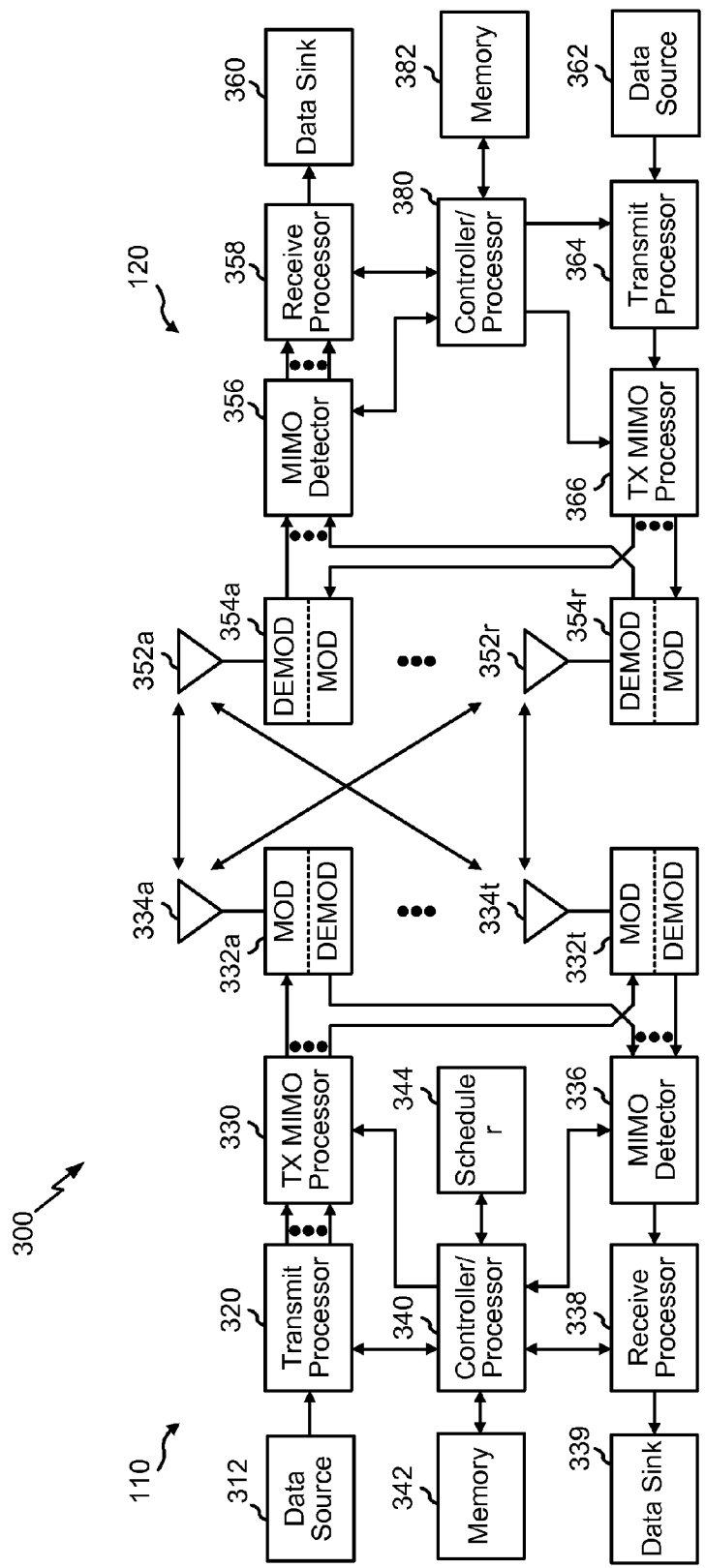
FIG. 3 is a block diagram conceptually illustrating a design of a base station/eNodeB and a UE configured in accordance with aspects of the present disclosure.

FIG. 3 shows a block diagram 300 of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 9-11, and/or other processes for the techniques described herein.

The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Carrier Aggregation

LTE-Advanced UEs use spectrum, in bandwidths of up to 20 MHz allocated in a carrier aggregation of up to a total of 100 MHz (5 component carriers), for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

To meet LTE-Advanced requirements, support of transmission bandwidths wider than 20 MHz may be required. One solution is carrier aggregation. Carrier aggregation allows expansion of effective bandwidth delivered to a UE 120 through concurrent utilization of radio resources across multiple carriers. Multiple component carriers are aggregated to form a larger overall transmission bandwidth.

Carrier Aggregation Types

Figure 4A:
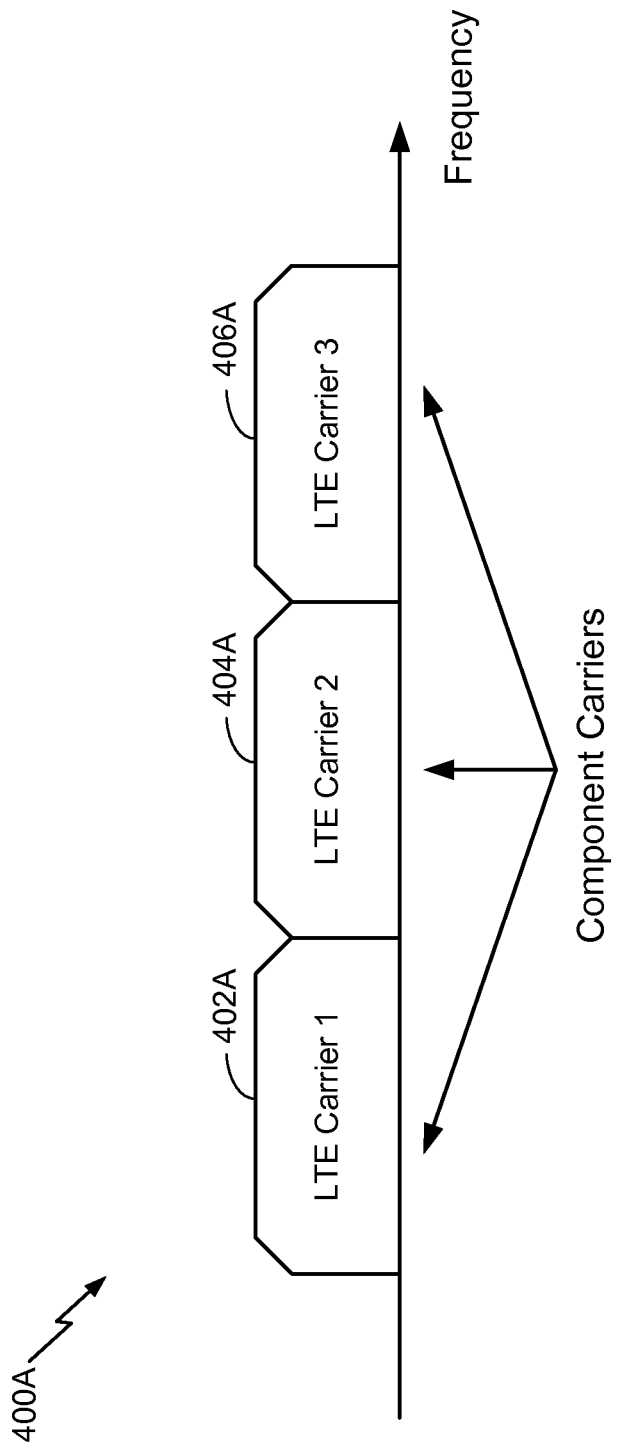
FIG. 4A illustrates a continuous carrier aggregation type, in accordance with aspects of the present disclosure.
Figure 4B:
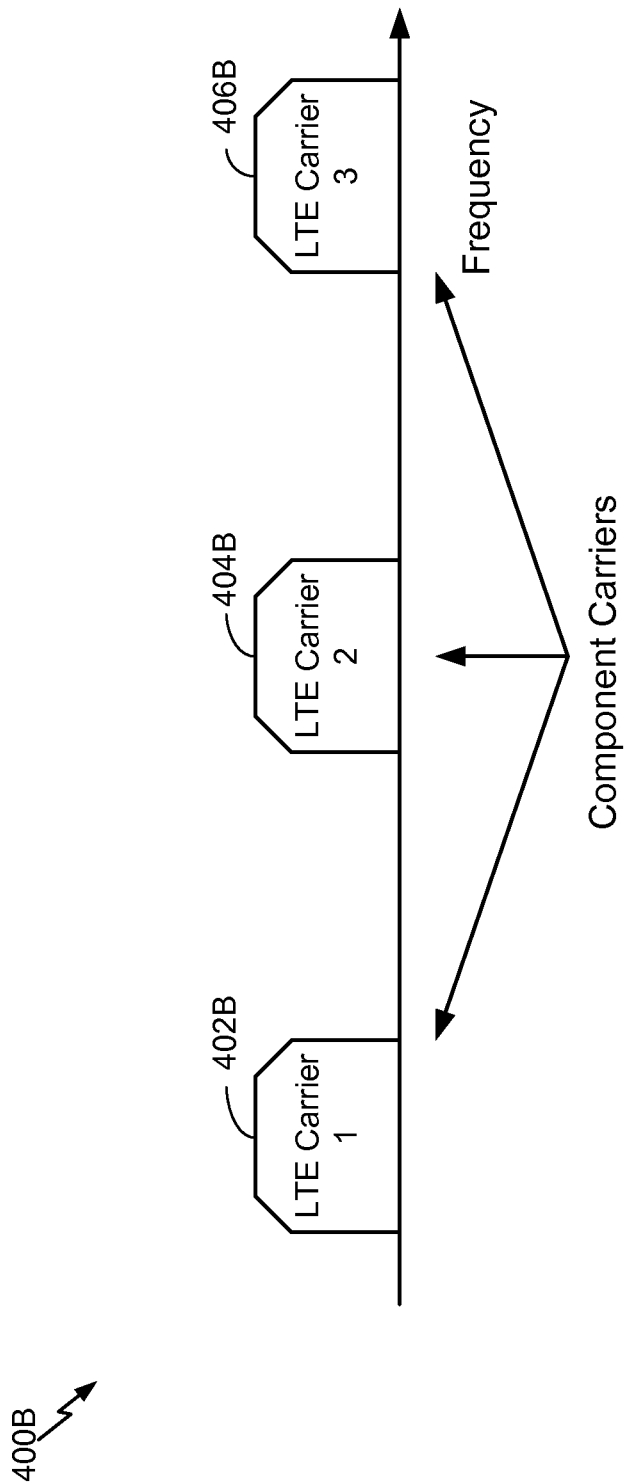
FIG. 4B illustrates a non-continuous carrier aggregation type, in accordance with aspects of the present disclosure.

For LTE-Advanced mobile systems, two types of carrier aggregation (CA) methods have been proposed, continuous CA and non-continuous CA, which are illustrated in FIGS. 4A and 4B.

FIG. 4A illustrates an example of continuous CA 400A, according to aspects of the present disclosure. Continuous CA occurs when multiple available component carriers 402A, 404A, and 406A are adjacent to each other, as illustrated in FIG. 4A.

FIG. 4B illustrates an example of non-continuous CA 400B, according to aspects of the present disclosure. Non-continuous CA occurs when multiple available component carriers 402B, 404B, and 406B are separated along the frequency band, as illustrated in FIG. 4B. Both non-continuous and continuous CA aggregates multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the eNodeB has fixed transmitting power on each component carrier, the effective coverage or supportable modulation and coding of each component carrier may be different.

Data Aggregation Schemes

Figure 5:
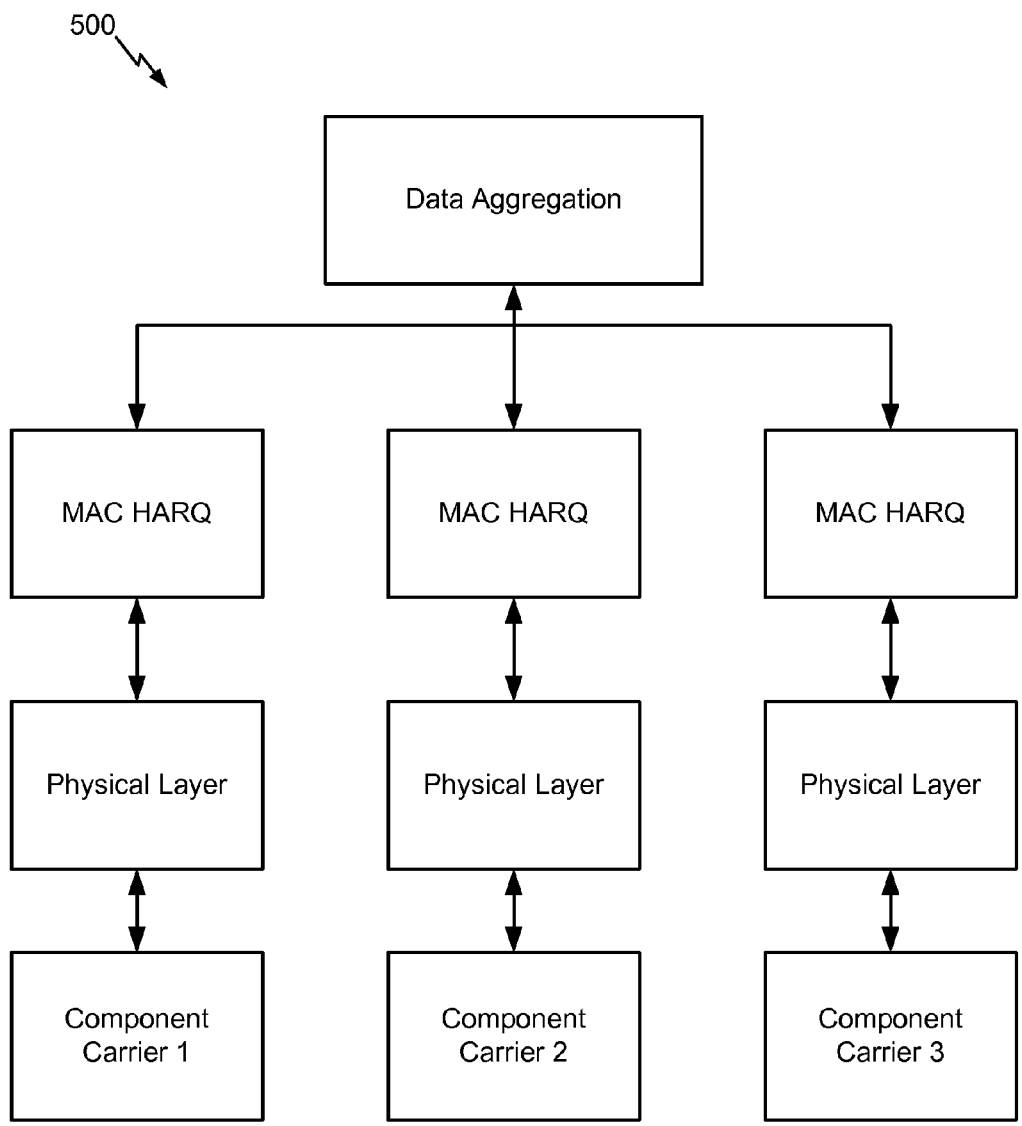
FIG. 5 illustrates MAC layer data aggregation, in accordance with aspects of the present disclosure.

FIG. 5 illustrates aggregating transmission blocks (TBs) 500 from different component carriers at the medium access control (MAC) layer for an International Mobile Telecommunications (IMT) Advanced (IMT-Advanced) system, in accordance with aspects of the present disclosure. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers.

The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

The third method involves jointly coding multiple control channels for different component carriers and then transmitting over the entire frequency band. This approach offers low signaling overhead and high decoding performance in control channels, at the expense of high power consumption at the UE side. However, this method is not compatible with LTE systems.

Handover Control

Handover occurs when a UE 120 moves from one cell 102, covered by a first eNodeB 110, into another cell 102 covered by a second eNodeB. It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNodeB to the UE, and on the uplink by the UE to the eNodeB.

In some embodiments, there may be multiple primary carriers. In addition, secondary carriers may be added or removed without affecting the basic operation of the UE, including physical channel establishment and radio link failure (RLF) procedures which are layer 2 procedures, such as in the 3GPP technical specification 36.331 for the LTE RRC protocol.

Figure 6:
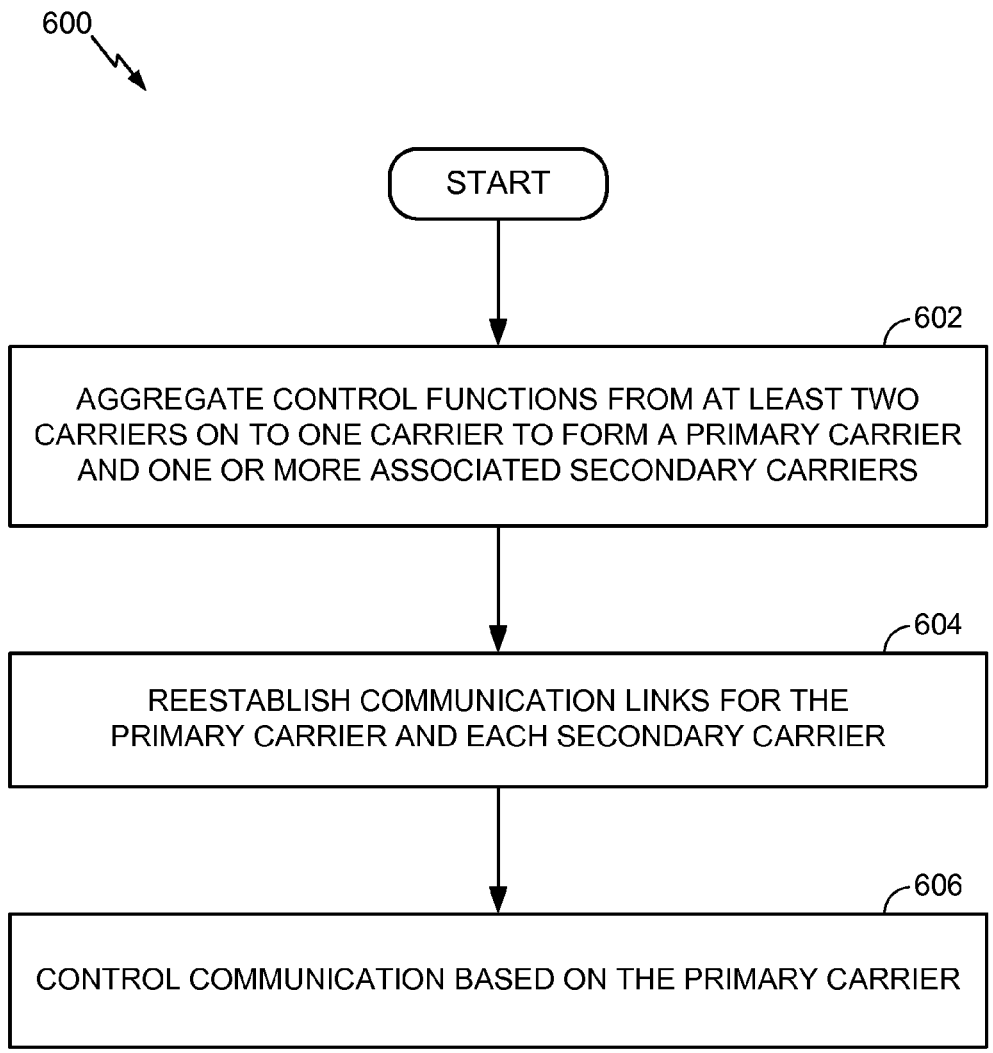
FIG. 6 is a block diagram illustrating a method for controlling radio links in multiple carrier configurations, in accordance with aspects of the present disclosure.

FIG. 6 illustrates a method 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next, at block 604, communication links are established for the primary carrier and each secondary carrier. Then, communication is controlled based on the primary carrier at block 606.

Search Space

In Long Term Evolution (LTE) Release-8, each user equipment (UE) may monitor both a common search space and a UE-specific search space in a control region. A search space may comprise a set of channel control element (CCE) locations where a UE may find its PDCCHs. One or more CCEs are used to transmit each PDCCH. All UEs are aware of the common search space, while the dedicated search space is configured for an individual UE. The maximum number of PDCCH candidates that a UE may attempt to decode in a subframe is listed in Table 1. The PDCCH candidates are transmitted using a number of the CCEs. Nine sets of four physical resource elements (REs) known as resource element groups (REGs) make up each CCE. Thus, one CCE equals 36 REs. Each search space is further classified into PDCCH aggregation levels for different protection of the control channel transmission. The number of CCEs used for a PDCCH may be 1, 2, 4, or 8. Each search space comprises a group of consecutive CCEs which could be allocated to a PDCCH called a PDCCH candidate. For each aggregation level, each UE has to try to decode more than one possible candidate. The CCE aggregation level determines the number of PDCCH candidates in a search space and is given by the PDCCH format. Table 1 gives the number of candidates and size of the search space for each aggregation level.

TABLE 1

| TYPE | Aggregation Level | Size in CCEs | Number of PDCCH Candidates |
|---|---|---|---|
| UE-Specific | 1 | 6 | 6 |
| UE-Specific | 2 | 12 | 6 |
| UE-Specific | 4 | 8 | 2 |
| UE-Specific | 8 | 16 | 2 |
| Common | 4 | 16 | 4 |
| Common | 8 | 16 | 2 |

It can be observed in Table 1 that that there may be up to six PDCCH candidates in the common search space (i.e., four for control channel element (CCE) aggregation level 4, and two for aggregation level 8), and up to 16 candidates in the UE-specific search space (i.e., six for aggregation level 1, six for aggregation level 2, two for aggregation level 4, and two for aggregation level 8). It can be observed from Table 1 that a number of CCEs to be searched within each PDCCH candidate of a plurality of PDCCH candidates may depend on the aggregation level. Thus, there are 4 PDCCH candidates for common aggregation level 4 and 2 PDCCH candidates for common aggregation level 8 even though both are sixteen CCEs in size. To find its PDCCH, the UE monitors a set of PDCCH candidates in every subframe. In Rel-8, each candidate may carry up to two downlink control information (DCI) sizes. As a result, the total number of blind decodes for a UE is up to $(4+2)*2+(6+6+2+2)*2=44$ in any subframe. In Rel-10, due to the introduction of UL MIMO, in the UE-specific search spaces, each candidate may carry up to three downlink control information (DCI) sizes, leading to the total number of blind decodes for a UE up to $(4+2)*2+(6+6+2+2)*3=60$ in any subframe. Note that the search spaces among common and UE-specific, and for different aggregation levels might overlap. This overlap, if such occurs, limits the possibility of scheduling a UE due to potential collision with other UEs. LTE-A offers the opportunity for a UE to monitor multiple carriers at the same time. In this case, it is desirable to limit the total number of blind decodes, e.g., still 44 (or higher but limited) comparing to the single-carrier operation.

Many motivations exist for an enhanced physical downlink control channel (ePDCCH). For example, ePDCCH may provide carrier aggregation (CA) enhancements, help support new carriers which may not be backwards compatible, reduce control channel capacity limitations of coordinated multipoint (CoMP) transmissions, and enhance DL MIMO.

According to aspects of the present disclosure, an ePDCCH may support increased control channel capacity and frequency-domain Inter Cell Interference Coordination (ICIC). ePDCCH may achieve improved spatial reuse of control channel resources. As well, the ePDCCH may support beamforming and/or diversity, operate on new carrier types and in Multicast-Broadcast Single Frequency Network (MBSFN) subframes, and may coexist on the same carrier as legacy UEs. The ePDCCH may be scheduled in a frequency-selective manner and may mitigate inter-cell interference.

Figure 7:
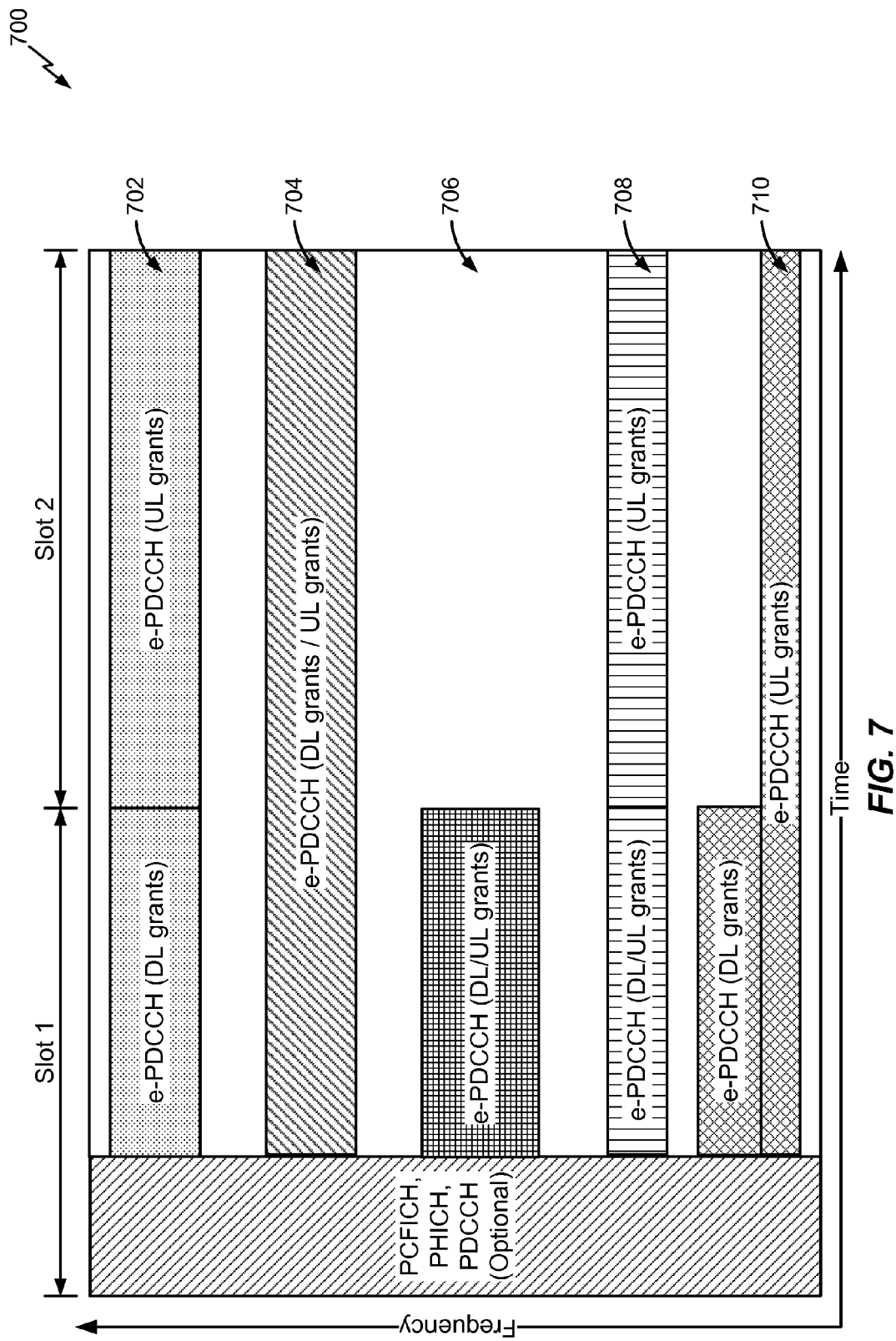
FIG. 7 illustrates possible structures for transmission of ePDCCH, in accordance with aspects of the present disclosure.
Figure 8:
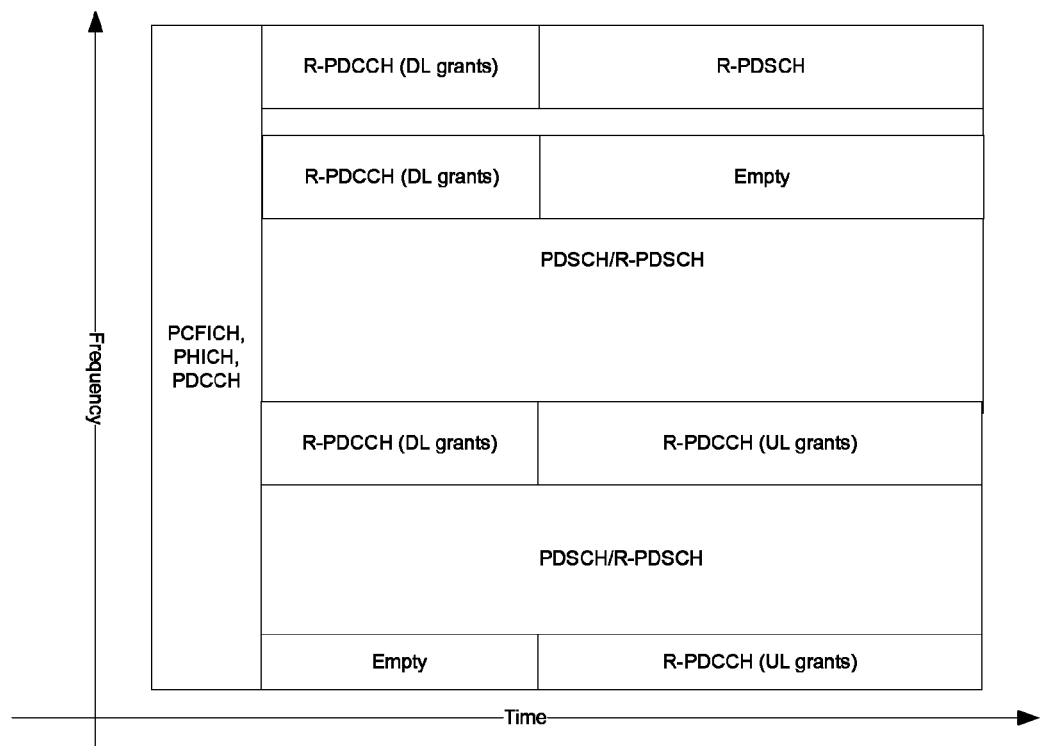
FIG. 8 illustrates possible structures for transmission of R-PDCCH, in accordance with aspects of the present disclosure.

FIG. 7 illustrates possible structures for ePDCCH 700, according to aspects of the present disclosure. As will be described in more detail below, aspects presented herein provide various schemes for ePDCCH placement, including: placement similar to relay PDCCH (R-PDCCH), a pure frequency division multiplexing (FDM) scheme, a time division multiplexing (TDM) scheme, placement similar to a R-PDCCH (e.g., R-PDCCH-like scheme, with ePDCCH DL in a first slot and ePDCCH UL in either the first or second slot), and a hybrid TDM and FDM scheme.

According to a first alternative, 702, the ePDCCH may be transmitted similarly to transmission of the R-PDCCH, wherein DL grants may be transmitted in a first slot and UL grants may be transmitted in a second slot. According to aspects, the second slot may be used for downlink data transmission if the second slot is not being used for the transmission of uplink grants.

According to a second alternative, 704, the ePDCCH may be transmitted in a pure FDM scheme, wherein DL grants and UL grants span the resource block (RB). As shown, a set of resources in the frequency domain are allocated for transmission of ePDCCH across a time domain comprising a first time slot and a second time slot. According to certain aspects, a subset of RBs multiplexed in the frequency domain with PDSCH are allocated for transmitting ePDCCH including both uplink and downlink grants across the first and second time slots.

According to a third alternative, 706, the ePDCCH may be transmitted in a first slot according to a TDM scheme, wherein DL and UL grants are transmitted in a first slot. As illustrated, the remaining RBs may be utilized for transmitting the PDSCH data transmissions.

According to a fourth alternative, 708, the ePDCCH may be transmitted in a manner similar to R-PDCCH, wherein DL and UL grants may be transmitted in a first slot and UL grants may be transmitted in a second slot. According to certain aspects, if a DL grant is transmitted in a first PRB of a given PRB pair, then an UL grant may be transmitted in a second PRB of the PRB pair. Otherwise, an UL grant may be transmitted in either the first or second PRB of the PRB pair.

According to a fifth alternative, 710, the ePDCCH may be transmitted using TDM for DL grants in a first slot and FDM for UL grants spanning a first and second slot.

Control Channel Management for Relay Backhaul

Aspects of the present disclosure provide techniques for managing control channels for relays that utilize half-duplex operation. The techniques discussed herein may also be applicable to relays that utilize full-duplex operation, a half-duplex UE, and/or a full-duplex UE. According to certain aspects, a certain type of PDCCH may be selected based on one or more criteria. As will be described in greater detail herein, for example, a TDM-based PDCCH transmission may be selected or a FDM-based PDCCH transmission may be selected, based on determined suitability for a given relay node's processing capability, power limitations, channel conditions, a carrier type, presence or absence of a common (or cell-specific) reference signal, or distance between a relay node and donor base station (e.g., as indicated by uplink timing advance).

In certain systems, e.g., LTE Rel-10, relay nodes have been introduced to extend coverage and/or capacity enhancements. As described above, a relay node may communicate with a donor base station (eNodeB or eNB) on a backhaul link and relay communications, on an access link, to a UE served by the donor base station. There is generally no expected impact from the functionality added by this work item and it may be required that all legacy UEs (e.g., that operate in accordance with pre-release 10) can be served by the relay cell.

Both full-duplex and half-duplex relays may be supported. Full-duplex operation may be realized via out-band and in-band via spatial interference management and there may be no standard impact. Half-duplex operation, on the other hand, may require standardized solutions.

For half-duplex relays, a set of DL (or UL) subframes are split between the backhaul link (between donor eNB and a relay node) and the access link (between a relay node and the UE served by the relay node).

Since a half-duplex relay of a legacy carrier type has to transmit a legacy control channel by itself, it cannot simultaneously monitor a legacy control channel transmitted by a donor eNB. For this reason, a Relay Physical Downlink Control Channel (R-PDCCH) may be introduced in Rel-10. Typically, however, a Relay PCFICH (R-PCFICH) and R-PHICH control channels may not be supported. Both common reference signal (CRS) and demodulation reference signal (DM-RS) based R-PDCCH may be supported. A relay node may be semi-statically configured with a set of PRBs for R-PDCCH. Both frequency distributed and frequency localized R-PDCCH placement may be supported.

R-PDCCH interleaving (for different relay nodes) may be supported. For CRS based R-PDCCH, both Rel-8 type REG level interleaving (intra-PRB interleaving) and inter-PRB only interleaving may be supported. For DM-RS based R-PDCCH, inter-PRB only interleaving may be supported, for example, with one PRB only serving one relay node at any time.

R-PDCCH may be transmitted using time division multiplexing (TDM). For example, DL grants may always be transmitted in a first slot of a subframe, in order for a relay node (RN) to still benefit from early decoding (control channel decoding can be done before the end of the subframe before proceeding to PDSCH decoding), similar to legacy PDCCH. If a DL grant is transmitted in the first PRB of a given PRB pair, then an UL grant may be transmitted in the second PRB of the PRB pair.

In a DM-RS based transmission, the DL grant and UL grant in a PRB pair may be required to be for the same RN. In such a case, a requirement may be that no REs in such a PRB pair can be used for a different RN. In a CRS-based transmission, the DL grant and UL grant in a PRB pair can be for the same or different RNs. In this manner, a boundary between UL and DL grants may be at the slot boundary.

There may be certain constraints on starting symbols for R-PDCCH and corresponding PDSCH for the relay (or R-PDSCH, for convenience). For example, R-PDCCH may start at OFDM symbol s1 (symbol index starts from 0), while (R-)PDSCH starts at OFDM symbol s2 in PRB(s) not containing R-PDCCH. s1 may be fixed, for example, to symbol #$3$. s2 may be configurable in the range $m \leq s2 \leq 3$. A RN may be informed of s2 via higher layer signaling.

Regarding DL backhaul timing, two cases may be supported. According to one aspect, the RN DL access transmit time may be slightly offset with respect to DL backhaul reception time at the RN, in order to fully utilize the entire backhaul subframe. According to another aspect, the RN may receive the DL backhaul subframe starting from OFDM symbol $m \geq k$ until OFDM symbol $n < 13$ (depending on the propagation delay and the switching time). RN DL transmissions may be synchronized with the eNB DL transmissions. Similar to the above DL backhaul timing cases, multiple UL backhaul timing cases are supported.

As noted above, in LTE Rel-8/9/10, a "legacy" PDCCH is located in a first several symbols in a subframe, with PDCCHs fully distributed in the entire system bandwidth and time division multiplexed (TDM'd) with PDSCH. Thus, a subframe is effectively divided into a control region and a data region.

In later systems (e.g., Rel-11 systems), new control channels, such as an enhanced PDCCH (ePDCCH), may be introduced. Unlike legacy PDCCH, which occupies the first several control symbols in a subframe, ePDCCH may occupy the data region, similar to PDSCH. Possible advantages of ePDCCH may include an increased control channel capacity, support for frequency-domain inter-cell interference cancellation (ICIC), improved spatial reuse of control channel resources, support for beamforming and/or diversity, operations on a new carrier type and in MBSFN subframes, and coexistence on the same carrier as legacy UEs.

Both localized and distributed transmission of ePDCCH may be supported. DM-RS based ePDCCH transmission may be supported, e.g., utilizing antenna ports 107, 108, 109, and 110, while PDSCH utilizes antenna ports 7-14. ePDCCH may also be FDM based, for example, spanning both first and second time slots of a subframe (FDM based ePDCCH). In some cases, there may be a restriction on the maximum number of transport channel (TrCH) bits receivable in a transmission time interval (TTI), for example, to allow a relaxation of the processing requirements for the UE.

Multiplexing of PDSCH and ePDCCH within a PRB pair may not be permitted. Thus, this is different from TDM based R-PDCCH. In LTE-11, there may be no common search space for ePDCCH, but this may be introduced in future releases. It should also be noted that there is no common search space for R-PDCCH.

Various observations may be made when comparing ePDCCH and R-PDCCH type control channels. For example, TDM based R-PDCCH provides early decoding benefits and can work with both CRS and DM-RS, but may not be very efficient for DL operations (and no common search space as in Rel-10). Performance of R-PDCCH may be compromised if the decoding only relies on DM-RS in the first slot, but if the second slot DM-RS is used for R-PDCCH decoding, early decoding benefits will be compromised. It is possible that if a PRB pair only carries UL grants (which are located only in the second slot), the first slot of the PRB pair will be wasted, resulting in some loss in DL efficiency.

FDM based ePDCCH, on the other hand, may be more efficient (and possibly have a common search space), but does not have early decoding benefits and is designed to work with only DM-RS in Rel-11. In order to minimize the impact (e.g., to satisfy the 3 ms processing delay between PDSCH transmission and HARQ feedback), a UE may not be able process the peak rate PDSCH transmissions especially at large UL timing advance. Further, as noted above, some transport block size limitation may be done at eNB, especially for UEs with large UL timing advance. Timing advance information for a UE may not be known by an eNB, but an eNB may be able to determine a UE's timing advance information. Also, in a cell of a legacy carrier type, common or cell-specific reference signals (CRS) have to be transmitted. Since ePDCCH is always based on DM-RS, the resource elements (REs) occupied by CRS are not available for ePDCCH. Compared with CRS based R-PDCCH, ePDCCH would thus experience some dimensional loss due to CRS. In a cell of a new carrier type, CRS may not be transmitted in all subframes, and/or with a full bandwidth. In particular, in a subframe without CRS, there would not be any dimensional loss for ePDCCH.

Various issues may thus be considered when determining which type of PDCCH is most suitable for a particular scenario. For example, different relay nodes may have different processing capabilities. For example, a relay node may be plugged into a source of power and be able to afford higher-order complexity processing. On the other hand, a relay node may rely on a battery and may prefer lower-order complexity processing. A relaying function performed by a base station with little or no power limitation may afford more powerful processing while a relaying function performed by a user equipment may be less powerful. As another example, if a subframe contains CRS, CRS based R-PDCCH may be chosen to avoid dimensional loss in the case of DM-RS based ePDCCH due to CRS overhead. As another example, if a relay node is of a new carrier type, ePDCCH may be chosen, since the relay node is only transmitting CRS in a sparse manner. As another example, if a donor eNB is of a legacy carrier type and transmits legacy PDCCH, and a relay node served by the donor eNB is of a new carrier type (such that the relay node does not need to transmit legacy control by itself), both legacy PDCCH and ePDCCH may be supported by the relay node for backhaul communications. According to certain aspects, mechanisms similar to those for selection between R-PDCCH and ePDCCH are also applicable to the selection between legacy PDCCH and ePDCCH for backhaul communications.

Processing capabilities may also depend on channel conditions. For example, processing capabilities of a relay node may depend on UL timing advance at the RN (typically the UL timing advance at the RN depends on how far the RN is away from the donor eNB; the farther the distance, the larger the UL timing advance). A large UL timing advance typically implies a shorter processing delay between PDSCH transmissions and the corresponding HARQ feedback. As another example, a mobile relay may transition from stationary to high-speed, with the corresponding change in channel conditions affecting the relay's processing of R-PDCCH or ePDCCH.

According to certain aspects of the present disclosure, these issues may be addressed by allowing the selection between a R-PDCCH or ePDCCH based on various criteria.

Depending on the capability and/or operating condition of a relay node and/or the corresponding donor eNB, a determination may be made whether to use R-PDCCH or ePDCCH. In some cases, the determination can be solely done by the donor eNB (DeNB). A donor eNB (DeNB) may determine the type of the relay node, and/or the operation conditions, and indicate whether R-PDCCH or ePDCCH should be used for the relay node.

Alternatively, the determination can be assisted by the relay node. For example, a relay node may indicate its preference for R-PDCCH or ePDCCH either explicitly or implicitly. According to certain aspects, the relay node may indicate its preference for R-PDCCH or ePDCCH via a one-bit information field in a transmission to a DeNB. According to other aspects, a relay node may indicate its preference for R-PDCCH or ePDCCH implicitly by indicating its processing condition, power condition, etc.

In some cases, the determination can be linked with the type of channel by which the relay node first accesses the system as a UE. The relay node when first accessing the system acts as a UE, and may rely on legacy PDCCH or ePDCCH to obtain the necessary information before it transitions to providing relaying function. For example, R-PDCCH for backhaul may be used if the relay node relies only on PDCCH when first accessing the system. On the other hand, ePDCCH may be used for backhaul if the relay node uses ePDCCH when first accessing the system In some cases, the determination may be linked to the carrier type. For example, if the carrier for the relay node and/or the donor eNB is a new carrier type, ePDCCH may be used for backhaul, such that a new carrier type may only need to handle one type of control channel—ePDCCH; otherwise, both R-PDCCH and ePDCCH may be used (a legacy carrier relay node may thus need to handle three types of control channels, PDCCH, R-PDCCH and ePDCCH). In some cases, the determination may be linked with the absence or presence of CRS. As an example, if a subframe contains CRS, a CRS-based R-PDCCH may be used; otherwise, a DM-RS based ePDCCH may be used.

The indication of the control channel type may be done by dedicated signaling or broadcast/multicast signaling. According to certain aspects, the control channel type may be semi-statically indicated. According to certain aspects, dynamic indication is possible, e.g., subframe-dependent R-PDCCH and ePDCCH.

Various example use cases are possible. For example, a donor eNB may govern two types of relay nodes: base station relays and UE relays, where ePDCCH is used for base station relays and R-PDCCH is used for UE relays. A mobile relay may start with ePDCCH when it's stationary and request to switch to CRS based R-PDCCH when it starts to move at a high speed. A relay node close to the DeNB may use ePDCCH for backhaul; a relay node far away from the DeNB may use R-PDCCH for backhaul, since a longer distance between the relay node and the DeNB typically means a large uplink timing advance and hence less processing time from PDSCH to HARQ feedback, implying that R-PDCCH may be preferable.

In some cases, a PDCCH type may be selected based on one or more criteria that relate to channel conditions between the relay node and the base station. For example, in some cases a first type of PDCCH (e.g., R-PDCCH) may be selected if an uplink timing advance of the relay node is above a threshold value (e.g., indicating a considerable distance from the relay node to the donor base station) and a second type of PDCCH (e.g., ePDCCH) may be selected if the uplink timing advance of the relay node is below a threshold value (e.g., indicating the relay node is closer to the donor base station).

In some cases, a PDCCH type may be selected based on one or more criteria that relate to mobility of the relay node. For example, a first type of PDCCH (e.g., R-PDCCH) may be selected if the relay node is moving at speed above a threshold value, while a second type of PDCCH (e.g., ePDCCH) may be selected if the relay node is stationary or moving at a speed below a threshold value.

In LTE Rel-11, CoMP operation is introduced for UEs. Similarly, CoMP operation may be applied to relay backhaul as well. This may be especially useful for mobile relays, for example, with virtual cell ID for R-PDCCH and the corresponding PDSCH, PUSCH, PUCCH, SRS, etc., interference measurement resources (IMRs), dynamic indication of rate matching parameters of PDSCH, and quasi-co-location between DM-RS and CSI-RS. For example, R-PDCCH may be enhanced to have two sets of resources separately configured and may have different resource allocation types, as well. Each set of resources may have its own virtual cell ID, R-PDCCH starting symbol, R-PDCCH end symbol, and R-PDCCH interleaving modes (e.g. DM-RS based PRB interleaving, CRS based PRB interleaving, CRS based REG interleaving). For example, two or more DL and/or UL timing cases can be supported by a relay node simultaneously targeting two or more donor eNBs involved in serving the relay nodes.

In one embodiment, when ePDCCH is used for backhaul communications, some modification is necessary. For instance, an end symbol may be specified for ePDCCH and the corresponding scheduled PDSCH in order to address different downlink backhaul timing cases. In particular, if there is a timing offset between a donor eNB and a relay node in a subframe, the end symbol for ePDCCH and the corresponding PDSCH may the last symbol of the subframe. If a donor eNB and a relay node are synchronous in a subframe, the end symbol for ePDCCH and the corresponding PDSCH may be the $2^{nd}$ to last symbol of the subframe. If two or more sets of ePDCCH resources are configured, the two or more sets may have the same or different end symbols. The two or more sets of ePDCCH resources may have the same or different starting symbols as well. The two or more sets of ePDCCH resources may also be associated with different downlink and/or uplink timing cases.

Figure 9:
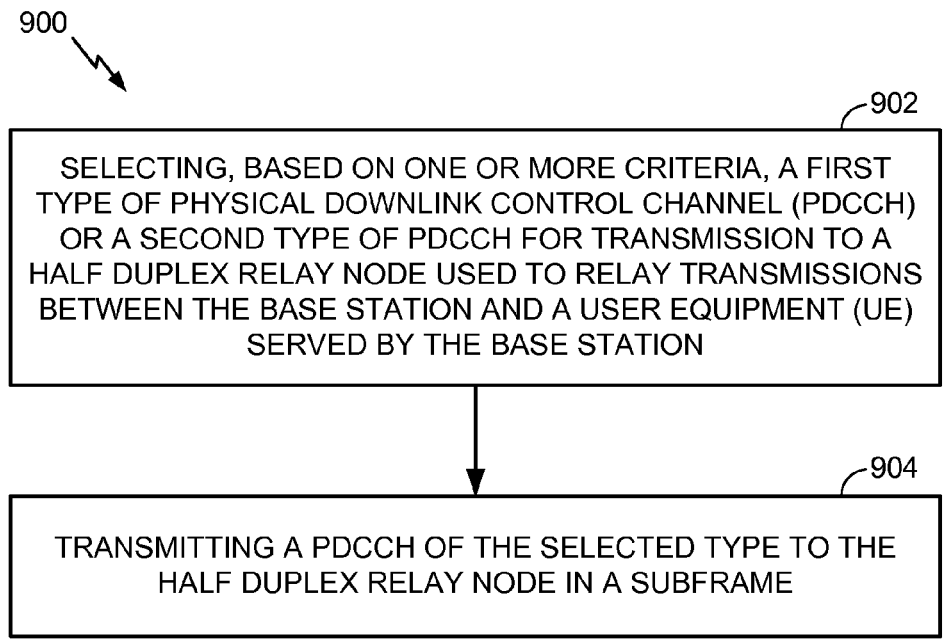
FIGS. 9-10 illustrate example operations, in accordance with various aspects of the present disclosure.

FIG. 9 illustrates example operations 900 that may be performed, for example, by a base station (e.g., a DeNB). The operations begin, at 902, by selecting, based on one or more criteria, a first type of physical downlink control channel (PDCCH) or a second type of PDCCH for transmission to a half duplex relay node used to relay transmissions between the base station and a user equipment (UE) served by the base station. At 904, the base station may transmit a PDCCH of the selected type to the half duplex relay node in a subframe.

The operations shown in FIG. 9 may be performed by any suitable means. For example, the selecting and transmitting may be performed by one or a combination of the processors of eNB 110 shown in FIG. 3.

According to certain aspects, a base station may configure a plurality of resource allocations for R-PDCCHs.

According to certain aspects, a base station may configure an end symbol for ePDCCH in a subframe.

Figure 10:
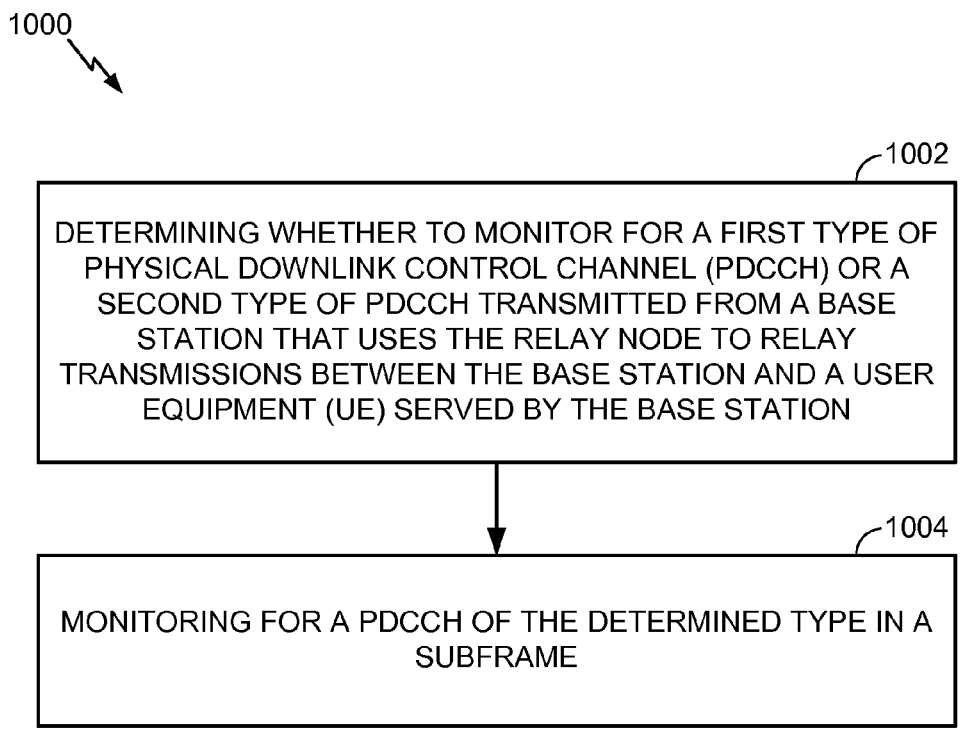

FIG. 10 illustrates example operations 1000 that may be performed, for example, by a relay node. The operations begin, at 1002, by determining whether to monitor for a first type of physical downlink control channel (PDCCH) or a second type of PDCCH transmitted from a base station that uses the relay node to relay transmissions between the base station and a user equipment (UE) served by the base station. At 1004, the relay node may monitor for a PDCCH of the determined type in a subframe.

The operations shown in FIG. 10 may be performed by any suitable means. For example, the determining and monitoring may be performed by one or a combination of the processors of the eNB 110 or UE 120 (if either is acting as a relay node) shown in FIG. 3.

According to certain aspects, a relay node may receive an indication of a plurality of resource allocations made for R-PDCCH.

According to certain aspects, a relay node may receive an indication of configuration of an end symbol for ePDCCH in a subframe.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a base station, comprising:
selecting, based on one or more criteria, between at least a first type of physical downlink control channel (PDCCH) and a second type of PDCCH for transmission to a half duplex relay node used to relay transmissions between the base station and a user equipment (UE) served by the base station; and
transmitting a PDCCH of the selected type to the half duplex relay node in a subframe.

2. The method of claim 1, wherein:
the first type of PDCCH is based on a TDM structure; and
the second type of PDCCH is based on an FDM structure.

3. The method of claim 1, wherein:
the first type of PDCCH is a relay PDCCH (R-PDCCH); and
the second type of PDCCH is an enhanced PDCCH (ePDCCH).

4. The method of claim 3, further comprising configuring a plurality of resource allocations for R-PDCCH.

5. The method of claim 3, further comprising configuring an end symbol in a subframe for ePDCCH.

6. The method of claim 1, wherein:
the first type of PDCCH is transmitted with common reference signals (CRS) or demodulation reference signals (DM-RS); and
the second type of PDCCH is transmitted with DM-RS and not CRS.

7. The method of claim 1, wherein the one or more criteria relate to processing capabilities of the relay node.

8. The method of claim 1, wherein the one or more criteria relate to channel conditions between the relay node and the base station.

9. The method of claim 8, wherein:
the first type of PDCCH is selected if an uplink timing advance of the relay node is above a threshold value; and
the second type of PDCCH is selected if the uplink timing advance of the relay node is below a threshold value.

10. The method of claim 1, wherein:
the one or more criteria relate to a type of PDCCH the relay node used for initial access when acting as a user equipment.

11. The method of claim 1, wherein:
the one or more criteria relate to a preferred type of PDCCH as indicated by the relay node.

12. The method of claim 1, further comprising:
providing an indication of the selected type of PDCCH to the relay node.

13. A method for wireless communications by a relay node, comprising:
determining between at least monitoring for a first type of physical downlink control channel (PDCCH) and monitoring for a second type of PDCCH transmitted from a base station that uses the relay node to relay transmissions between the base station and a user equipment (UE) served by the base station; and
monitoring for a PDCCH of the determined type in a subframe.

14. The method of claim 13, wherein:
the first type of PDCCH is based on a TDM structure; and
the second type of PDCCH is based on an FDM structure.

15. The method of claim 13, wherein:
the first type of PDCCH is a relay PDCCH (R-PDCCH); and
the second type of PDCCH is an enhanced PDCCH (ePDCCH).

16. The method of claim 15, further comprising receiving an indication of configuration of a plurality of resource allocations for R-PDCCH.

17. The method of claim 15, further comprising receiving an indication of configuration of an end symbol in a subframe for ePDCCH.

18. The method of claim 13, wherein:
the first type of PDCCH is transmitted with common reference signals (CRS) or demodulation reference signals (DM-RS); and
the second type of PDCCH is transmitted with DM-RS and not CRS.

19. The method of claim 13, wherein the determining is based, at least in part, on channel conditions between the relay node and the base station.

20. The method of claim 19, wherein the determining comprises:
determining to monitor for the first type of PDCCH if an uplink timing advance of the relay node is above a threshold value; and
determining to monitor for the second type of PDCCH if the uplink timing advance of the relay node is below a threshold value.

21. The method of claim 13, wherein the determining is based, at least in part, on a type of PDCCH the relay node used for initial access when acting as a user equipment.

22. The method of claim 13, further comprising:
transmitting an explicit indication of a preferred type of PDCCH from the relay node.

23. The method of claim 13, wherein the determining comprises:
receiving an indication of a selected type of PDCCH from the base station.

24. An apparatus for wireless communications by a base station, comprising:
at least one processor configured to select, based on one or more criteria, between at least a first type of physical downlink control channel (PDCCH) and a second type of PDCCH for transmission to a half duplex relay node used to relay transmissions between the base station and a user equipment (UE) served by the base station and transmit a PDCCH of the selected type to the half duplex relay node in a subframe; and
a memory coupled with the at least one processor.

25. The apparatus of claim 24, wherein:
the one or more criteria relate to a type of PDCCH the relay node used for initial access when acting as a user equipment.

26. The apparatus of claim 24, wherein the at least one processor is further configured to provide an indication of the selected type of PDCCH to the relay node.

27. An apparatus for wireless communications by a relay node, comprising:
at least one processor configured to determine between at least monitoring for a first type of physical downlink control channel (PDCCH) and monitoring for a second type of PDCCH transmitted from a base station that uses the relay node to relay transmissions between the base station and a user equipment (UE) served by the base station, and monitor for a PDCCH of the determined type in a subframe; and
a memory coupled with the at least one processor.

28. The apparatus of claim 27, wherein the determining is based, at least in part, on a type of PDCCH the relay node used for initial access when acting as a user equipment.

29. The apparatus of claim 27, wherein the at least one processor is further configured to transmit an explicit indication of a preferred type of PDCCH from the relay node.

30. The apparatus of claim 27, wherein the determining comprises:
   receiving an indication of a selected type of PDCCH from the base station.

* * * * *